(12) United States Patent
Subrahmanyam

(10) Patent No.: US 6,247,173 B1
(45) Date of Patent: Jun. 12, 2001

(54) COMPUTER COMPILER OPTIMIZER FOR REDUCING COMPUTER RESOURCE CONSUMPTION DURING DEPENDENCE ANALYSIS AFTER LOOP UNROLLING

(75) Inventor: Pratap Subrahmanyam, Sunnyvale, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 08/937,092

(22) Filed: Sep. 24, 1997

(51) Int. Cl.$^7$ .................................................. G06F 9/45
(52) U.S. Cl. ........................................................ 717/9
(58) Field of Search ............... 717/4, 5, 9; 709/100–108

(56) References Cited

U.S. PATENT DOCUMENTS

| | | | |
|---|---|---|---|
| 5,187,789 | 2/1993 | O'Hair ..................................... | 707/4 |
| 5,212,794 | 5/1993 | Pettis et al. ............................ | 395/709 |
| 5,265,253 | 11/1993 | Yamada ................................. | 395/709 |
| 5,293,631 | 3/1994 | Rau et al. ............................. | 395/707 |
| 5,303,357 | 4/1994 | Inoue et al. ........................... | 395/709 |
| 5,313,635 | 5/1994 | Ishizuka et al. ...................... | 395/705 |
| 5,361,351 | 11/1994 | Lenkov et al. ....................... | 395/704 |
| 5,367,651 | 11/1994 | Smith et al. .......................... | 395/709 |
| 5,367,684 | 11/1994 | Smith ................................... | 395/709 |
| 5,375,242 | 12/1994 | Kumar et al. ......................... | 395/707 |
| 5,438,669 | 8/1995 | Nakazawa et al. ................... | 712/222 |
| 5,485,619 | 1/1996 | Lai et al. .............................. | 395/706 |
| 5,487,158 | 1/1996 | Amelina et al. ...................... | 395/705 |
| 5,526,499 | 6/1996 | Bernstein et al. .................... | 712/216 |
| 5,537,620 | 7/1996 | Breternitz, Jr. ....................... | 395/709 |
| 5,548,761 | 8/1996 | Balasundaram et al. ............. | 395/707 |
| 5,581,762 | 12/1996 | Hayashi et al. ...................... | 395/709 |
| 5,627,981 | 5/1997 | Adler et al. .......................... | 712/235 |
| 5,790,859 | * 8/1998 | Sarkar ................................... | 395/704 |
| 5,842,022 | * 11/1998 | Nakahira et al. ..................... | 395/709 |
| 5,852,734 | * 12/1998 | Komatsu et al. ..................... | 395/707 |
| 5,953,531 | * 9/1999 | Megiddo et al. ..................... | 395/709 |
| 6,078,745 | * 6/2000 | De Greef et al. .................... | 395/705 |

OTHER PUBLICATIONS

Shaw; "Analyzing the Optimization Techniques Compilers Use to Transform Your C Code; Tutorial"; Mar. 1991.
Goff, et al.; "Practical Dependence Testing"; Jun. 1991.
Maydan, et al.; "Efficient and Exact Data Dependence Analysis"; Jun. 1991.

* cited by examiner

Primary Examiner—St. John Courtenay, III
Assistant Examiner—George Opie
(74) Attorney, Agent, or Firm—Christine H. Smith

(57) ABSTRACT

A method and apparatus for improving the process of determining whether two computer system memory references are exactly dependent. While loop unrolling creates a large number of memory reference pairs which must be analyzed during the data dependence analysis phase of compiler optimization, this invention reduces the computer resources required for this analysis. When two memory references are exactly dependent, the present invention quickly determines the distance between them by an elegant method which uses easily accessible values. Therefore, if two memory references are exactly dependent, and if the distance is an integral greater than zero then the compiler optimizer may re-use the same data in computer memory and thus reduce the need to execute computer register instructions. Alternately, if the two memory references are independent they become candidates for pipeline scheduling. This further reduces the use of computer resources.

17 Claims, 5 Drawing Sheets

COMPUTER COMPILER OPTIMIZER FOR REDUCING COMPUTER RESOURCE CONSUMPTION DURING DEPENDENCE ANALYSIS AFTER LOOP UNROLLING

FIELD OF THE INVENTION

The present invention relates to systems and methods for compiler optimizers for computers. More particularly, the present invention relates to lowering the overhead of determining data dependence analysis information after applying the compiler optimization loop unrolling.

BACKGROUND OF THE INVENTION

Many computers have been designed to execute instructions which are independent of other instructions in a parallel rather than a serial fashion. The decision regarding whether an instruction is independent and a candidate for parallel execution can be made by a computer compiler when source code is compiled, and is a type of compiler optimization.

Another type of compiler optimization comprises data dependence analysis and the determination of computer memory location candidates for redundant load instruction elimination. Re-loading information from memory into a computer register which has previously been loaded by a compiled program is considered a redundant load instruction which wastes computer resources. When the target of a load instruction is the same as a previous store or load instruction, a compiler will attempt to eliminate this redundant load instruction to yield more efficient code. However, determining whether two load instructions access the same memory location is a complicated process.

Dependence analysis is a compiler technology used to determine whether two memory references in a loop access the same memory location, even across loop iterations. That is, dependence analysis is used to determine whether a subsequent register load action will access the same location that was stored on a previous loop iteration. The data dependence phase of compiler optimization also allows independent memory operations to be scheduled concurrently by methods such as pipeline scheduling to exploit instruction level parallelism, while exactly dependent or possibly dependent memory references must continue to be executed in instruction order. The data dependence analysis phase is sometimes termed memory disambiguation. The process of data dependence testing often requires extensive analysis of pairs of memory references in a loop, and is a very large and computer resource intensive solution to apply to the problem of memory disambiguation.

Loop unrolling may be produced by a method of replicating a loop during the process of compilation. Data dependence distance is related to the number of loop iterations and is always an integer value. More particularly, data dependence distance for a dependent memory reference pair is the number of loop iterations required for a second memory reference to reach the same memory reference location as the first memory reference previously accessed. Loop carried dependence occurs when the data dependence distance is greater than zero and therefore, at least one loop iteration is required to reach the distance between two exactly dependent memory references. One of the results of loop unrolling is the reduction of loop carried data dependence across loop iterations. While compiler optimizers may be optionally enhanced by the use of data dependence analysis with loop unrolling, data dependence analysis on an unrolled loop adds significant computer resource overhead to the compiler optimization process.

It should be evident that the current solution to compiler optimization analysis of repetitive loop instructions to determine if the memory reference is independent requires a great deal of computer resources. The large amount of memory references which result from loop unrolling only exacerbates the general problem related to the optimizer overhead involved in data dependence analysis. Current loop unrolling compiler optimizers can create efficient code but at the same time use significant computer resources to process optimization techniques on an unrolled loop which has become larger than the original loop. The opportunities for optimizing computer code for pipeline scheduling to take full advantage of powerful computer hardware and for reduction of register loads have not been fully realized due to the expense associated with data dependence analysis and loop unrolling.

SUMMARY OF THE INVENTION

The present invention may be implemented as part of an optimizing compiler in a novel way by combining data dependence analysis with loop unrolling to determine whether pipeline scheduling of independent memory references is possible or whether re-use of dependent memory references to reduce redundant load instructions is possible. The present invention does not require the typical extensive amount of compiler analysis and computer resources to perform data dependence analysis on an unrolled loop. Data dependence analysis for the pre-loop unrolled memory references is determined using techniques well known to those skilled in the art and includes tests such as the Fourier-Motzkin Test, the Bannerjee Test, the Equals Slope Test, and the GCD Test.

The present invention determines more quickly than in the past whether a pair of memory references in an unrolled loop are exactly dependent and if they are dependent, the precise data dependence distance between the two memory references. As previously discussed, determining the precise distance between data dependent memory references not only facilitates re-use of the memory reference but also refines the information available for further data dependence analysis. After loop unrolling, the present invention may assign one of two states, either independent or exactly dependent, to any memory reference pair which was exactly dependent before loop unrolling. Further, after the loop is unrolled the present invention assigns an independent state for any two memory references which were independent before the loop unrolled, thus eliminating further data dependence analysis for the previously independent memory reference pair.

When the pre-loop unrolled memory reference pair is exactly dependent, the preferred embodiment of the invention quickly determines the distance between the post-loop unrolled memory reference pair by an elegant method of using easily accessible values based on previously determined calculations from the pre-loop unrolled memory reference pair. Due to loop unrolling, a pair of memory references that was originally data dependent with a precise dependence distance is translated into many pairs of memory references. The present invention may be implemented by tagging as related the many post-loop unrolled memory reference pairs which are related to the same pre-loop unrolled memory reference pair. Further, the present invention may take advantage of the data dependence distance of any pre-loop unrolled exactly dependent memory reference pair to quickly translate the data dependence distance for any related post-loop unrolled memory reference pair having an exactly dependent state.

The present invention establishes for related, post-loop unrolled memory reference pairs, that only one memory reference pair exists which is exactly dependent and has an integral data dependence distance which is greater than zero. When the one distance which is an integer greater than zero is determined, no further data dependence analysis is required for any of the post-loop unrolled memory reference pairs which were tagged as related to the same pre-loop unrolled memory reference pair, since all other memory reference pairs related to the same pre-loop unrolled memory reference pair will be independent. This reduces the computer resources required for analysis after loop unrolling.

The quick recognition of whether two memory references are exactly dependent or independent after loop unrolling, the method of quick determination of exact dependence distances after loop unrolling, and the elimination of further analysis of a group of related memory reference pairs when an exactly dependent memory reference pair is located, all simplify the previous methods of data dependence analysis after loop unrolling.

Upon the determination of the one distance which is an integer greater than zero for an exactly dependent memory reference pair, the present invention reduces computer register accesses by identifying for the compiler that the contents of memory references can be re-used, thus eliminating a redundant load instruction. Otherwise, if the present invention determined that any two memory references are independent, the invention identifies for the compiler that the memory references are candidates for pipeline scheduling to enable instruction level parallelism.

Other aspects and advantages of the present invention will become apparent from the following detailed description, taken in conjunction with the accompanying drawings, illustrating by way of example the principles of the invention.

DESCRIPTION OF THE PREFERRED EMBODIMENT

Figure 1:
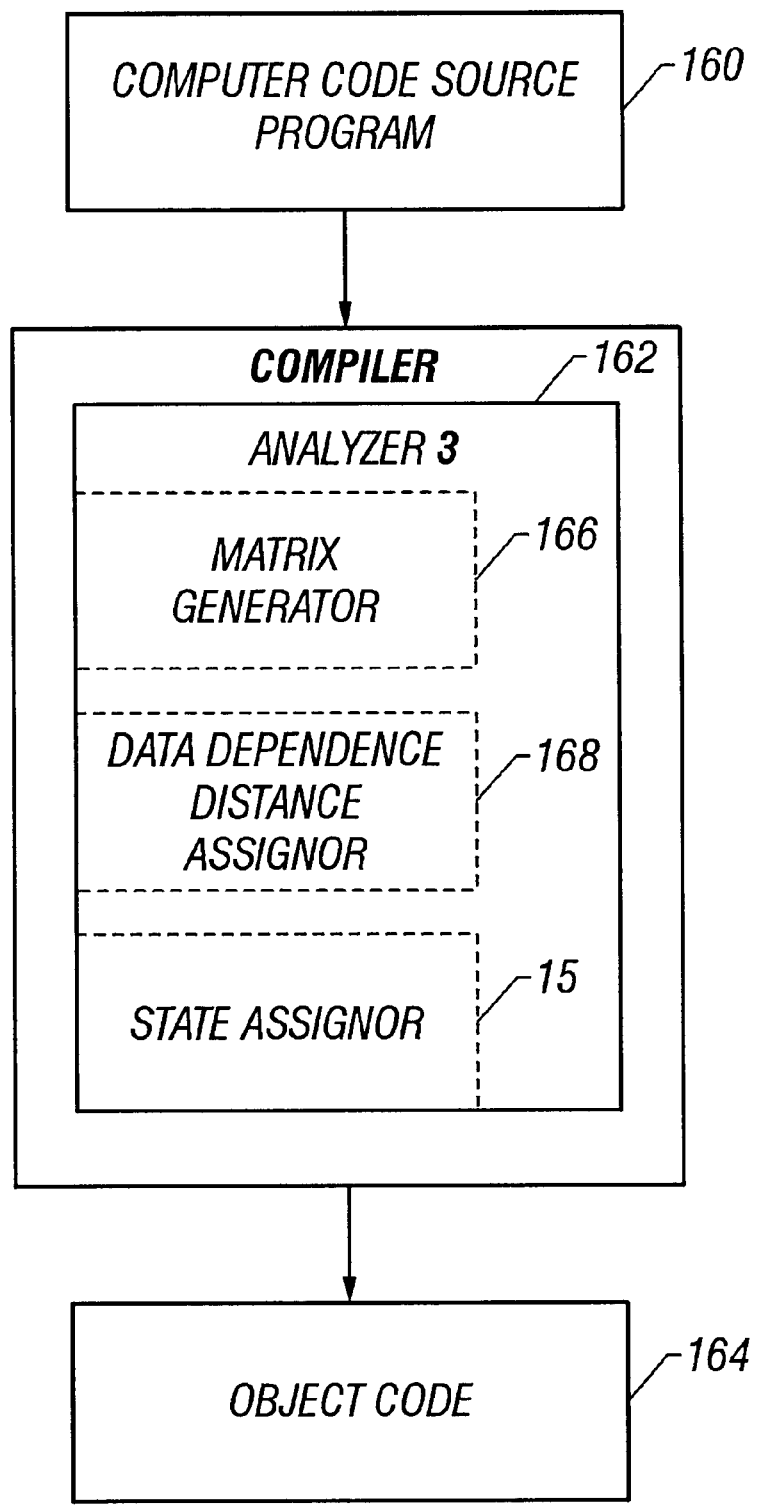
FIG. 1 is an illustration of a computer system including a loop unrolling, data dependence distance analyzer.

As shown in the drawings for purposes of illustration, the present invention reduces the computer resources required for loop unrolled data dependence analysis. Current compiler technology for loop unrolling data dependence analysis carries with it a high computer resource utilization overhead. The present invention takes advantage of powerful computer hardware by quickly determining when instruction level parallelism via pipeline scheduling can be employed. Additionally, the present invention reduces the overhead necessary to determine if reduction of register loads is possible.

The quick determination of whether two memory references are exactly dependent or independent after loop unrolling and the execution of the dependence distance determination of exactly dependent memory references streamline the process of loop unrolled dependence analysis. The recognition and exploitation of a relationship which exists between loop unrolled memory reference pairs which were propagated by the same pre-loop unrolled memory reference pair, and the elimination of further dependence analysis of any related memory references when an exact dependence distance is determined to be an integer greater than zero for one of the related memory reference pairs is more efficient than the previous Aft methods of data dependence analysis after loop unrolling. The present invention does not require the typical large amount of compiler analysis and computer resources to perform data dependence analysis on loop unrolled memory references.

Pipeline scheduling is one technology for scheduling the execution of computer instructions in parallel. For instance, pipeline scheduling is a way of planning the execution of loop iterations with independent computer instructions in an overlapping fashion. Pipeline scheduling executes independent computer instructions in parallel which takes advantage of powerful computer hardware by executing more computer instructions in a shorter period of time.

For a general discussion of existing compiler and optimizer technology, see *Principles of Compiler Design*, by Alfred V. Aho and Jeffrey D. Ullman (Addison-Wesley, 1977), which is herein incorporated by reference in its entirety. An important source of optimization is the identification of common sub-expressions and the substitution of values for names whose values are constant (Aho and Ullman, 409). Global constant folding, common sub-expression elimination, and symbolic analysis are optimizer operations used for substitution of names whose values are constant. The compiler optimizer performs a series of operations as shown below.

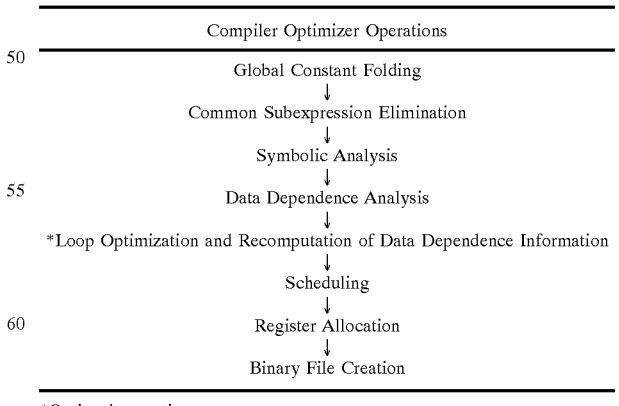

Compiler Optimizer Operations

Global Constant Folding
↓
Common Subexpression Elimination
↓
Symbolic Analysis
↓
Data Dependence Analysis
↓
*Loop Optimization and Recomputation of Data Dependence Information
↓
Scheduling
↓
Register Allocation
↓
Binary File Creation

*Optional operations

A data dependence exists between two statements source (S) and target (T) if both statements access the same location in memory and it is possible for both S and T to be executed within the same loop by the compiler, or in other words there is a path from S to T. To exploit parallelism and the memory hierarchy effectively, compilers must be able to analyze data dependencies for memory references in repetitive loop instructions. Even though data dependence analysis is complicated, it generally provides benefit by equivocating the state of two memory operations with regard to data dependency. That is, the pair of memory references related to an exactly dependent pre-loop unrolled memory reference pair are determined to be exactly dependent or independent after loop unrolling.

In the following detailed description and in the several figures of the drawings, like elements are identified with like reference numerals.

The following sample loop code is replicated twice, illustrating two loop iterations.

| Loop Code Segment Before Loop Unrolling | |
|---|---|
| for i = 1 to 10; | |
| - - - | i is incremented once for each loop iteration |
| - - - | |
| A[i+3] = A [i + 1] + 3; | Loop iteration 1 |
| i=i + 1; | |
| - - - | |
| - - - | Loop iteration 2 |
| A[i+3] = A [i + 1] + 3; | |
| i=i + 1; | |

As shown below, loop unrolling occurs when the loop body is replicated a number of times and the condition which terminates the execution of the loop is suitably incremented or decremented. If the loop shown above is unrolled by a factor of two, then the following loop would be substituted. This loop will contain two instances of the original loop code. However, this unrolled loop would have been executed half the number of times as the original loop will be executed.

| Loop Code Segment After Loop Unrolling | |
|---|---|
| for i = 1 to 10; | |
| | "i" is incremented once for each loop iteration but the original loop has been replicated. |
| - - - | The loop unroll factor in this example is two. |
| A[i+3] = A [i + 1] +3; | |
| - - - | Loop iteration 1 |
| A[i+4] = A [i + 2] +3; | |
| i=i + 2; | |

In general, the unrolled loop code will be adjusted to ensure that the appropriate number of instances of the original loop code are contained in the unrolled loop code. This code will translate any incrementing counters, such as "in" the example above, to ensure that the appropriate memory references will be addressed in the unrolled loop code.

In summary, if a pair of memory references is independent before loop unrolling, no further data dependence analysis is necessary. If a pair of memory references is generated from a pre-loop unrolled exactly dependent memory reference pair, this invention will disambiguate the post-loop unrolled memory references and determine whether the pair of memory references are independent or exactly data dependent.

A compiler optimizer developed according to the present invention, determines whether any pair of post-loop unrolled memory references which were generated from a pre-loop unrolled exactly data dependent memory reference pair are data dependent by comparing the memory reference information of the pair. Therefore the compiler optimizer functions as an analyzer to determine data dependence state information and the data dependence distance for a post-loop unrolled memory reference pair. Having completed data dependence analysis, the optimizing compiler establishes a table with the data dependence state and the data dependence distance information for each memory reference pair.

In FIG. 1 a computer system is shown having a software source program 160. The compiler 162, having a loop unroller and data dependence analyzer 3 which uses a matrix generator 166, a data dependence distance assignor 168, and a state assignor 15 translates source program 160 into computer machine object code 164.

Figure 2A:
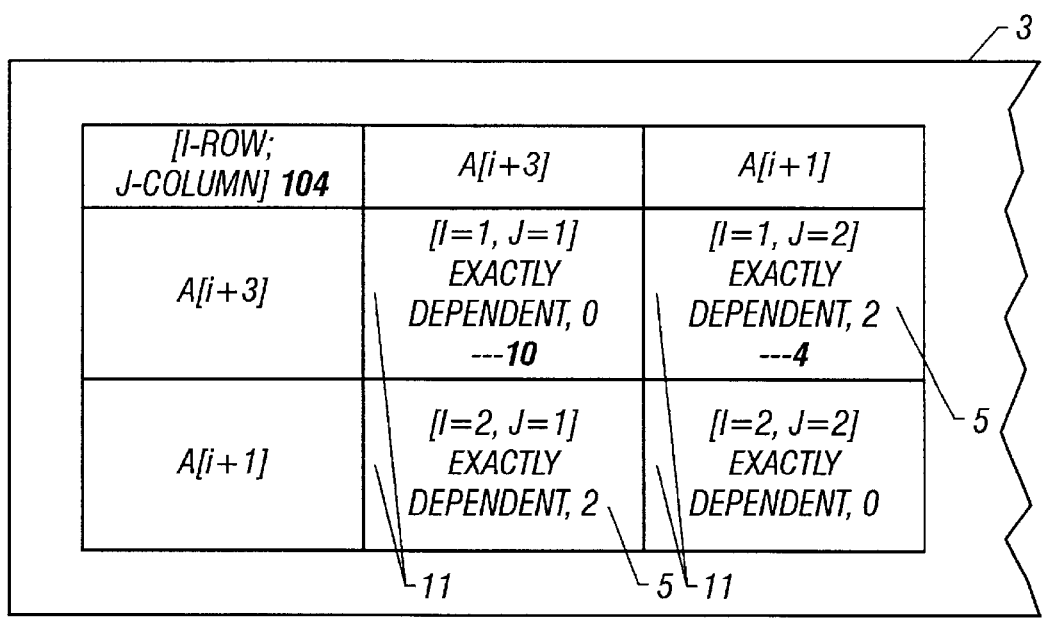
FIG. 2A is an illustration of a portion of the compiler analyzer that includes the dependence state and distance analysis matrix before loop unrolling.

Sample loop code 7, similar to the loop examples above, is shown in FIG. 2A. In the present invention, the compiler optimizer establishes the data dependence information corresponding to a pair of memory references. In a preferred embodiment of the present invention the compiler optimizer creates a data dependence information table, the pre-loop unrolled matrix 1, for the memory reference pairs 11, with data dependence state and data dependence distance information. The memory reference pairs are addressed by increment counters "I" and "J" 104. "I" is a row increment counter and "J" is a column increment counter. When a data dependence distance such as that shown in 5 is an integral number and greater than zero, the analyzer 3 may increase the efficiency of a compiler by indicating to the compiler that re-use of the memory reference pair to reduce redundant load instructions is possible, using techniques well known to those skilled in the art.

Figure 2B:
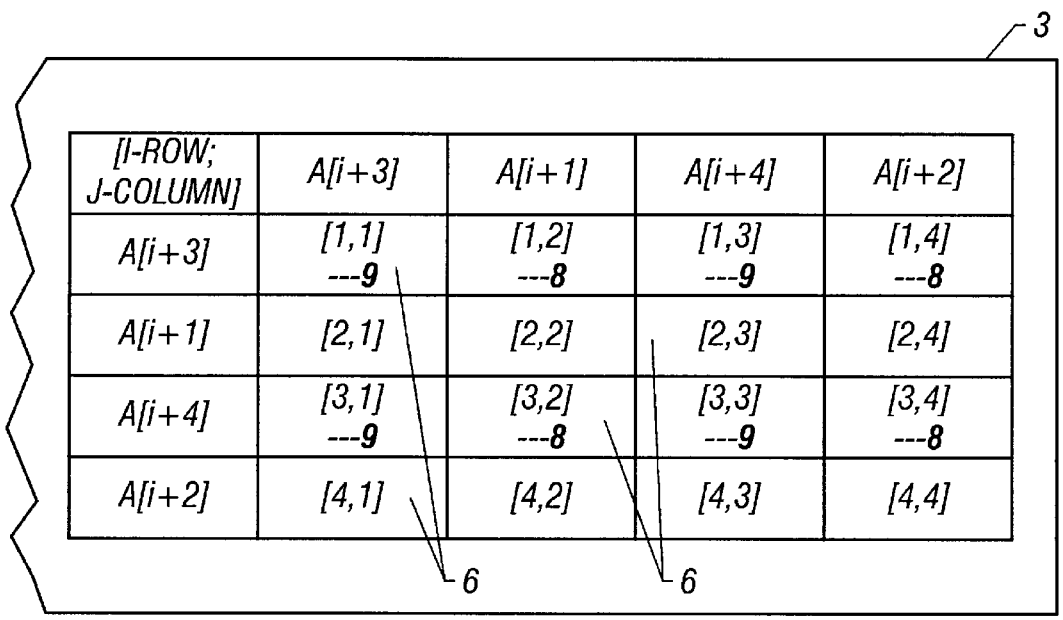
FIG. 2B is a further illustration of a portion of the compiler analyzer that includes the matrix created by the analyzer after loop unrolling which shows the relationship between memory reference pairs.

As shown in FIG. 2B, the analyzer 3 uses a matrix generator 166 (as shown in FIG. 1) to create a data dependence information table, such as the post-loop unrolled matrix 2. While the process of generating the post-loop unrolled matrix 2 reduces the loop carried dependence, it still contains a large number of memory reference pairs 6 requiring data dependence analysis. The post-loop unrolled matrix 2 illustrates that any one of post-loop unrolled memory reference pairs 6 is related to the other post-loop unrolled memory reference pairs 6 which are in turn related to one of the pre-loop unrolled memory reference pairs 11 (as shown in FIG. 2A).

For example, given an unroll factor "F" of two, the pre-loop unrolled exactly dependent memory reference pair 4 (as shown in FIG. 2A), A[i+3]×A[i+1] has been expanded in the post-loop unrolled matrix 2 to the following memory reference pairs 8:

A [i+3]×A [i+1]

A [i+3]×A [i+2]

A [i+4]×A [i+1]

A [i+4]×A [i+2]

It will be noted that memory reference A [i+3] has been unrolled to two memory references: A [i+3] and A [i+4]. Also, memory reference A[i+1] has been unrolled to: A[i+1] and A[i+2]. As this example illustrates, each exactly dependent memory reference pair 11 in the pre-loop unrolled matrix 1 has been similarly expanded in the post-loop unrolled matrix 2.

Figure 2C:
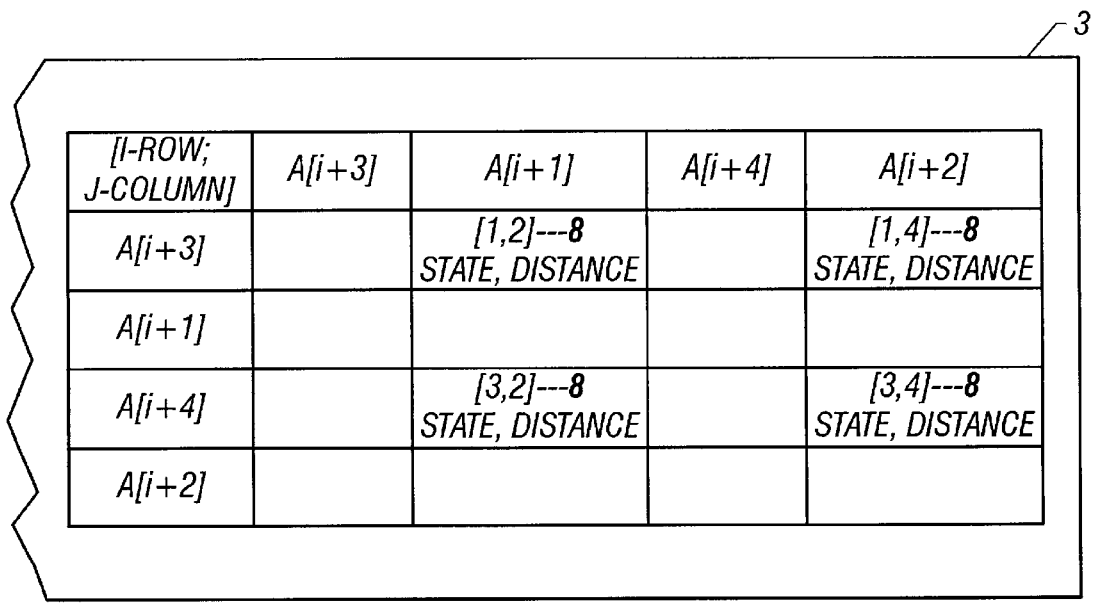
FIG. 2C is an expanded view of a portion of the compiler analyzer illustrating by example post-loop unrolled memory reference pairs which are related to a pre-loop unrolled exactly dependent memory reference pair.

A specific example of the present invention, as shown in FIG. 2C, illustrates the present invention including an analyzer 3. FIG. 2C illustrates by an exploded view how the present invention may create a table for the purpose of tagging those post-loop unrolled memory reference pairs 8 which are related to the same pre-loop unrolled memory reference pair 4 (as shown in FIG. 2A). This tagging allows the analyzer 3 to process related memory reference pairs as a unit. For instance, the analyzer 3 further determines the data dependence distance for any post-loop unrolled pair of related memory references 8 in a more efficient manner than was done for the pre-loop unrolled exactly dependent memory reference pair 4 (as shown in FIG. 2A).

The analyzer 3 also determines the distance of any post-loop unrolled memory reference pair 8 using "I", "J", and an unroll factor, F, and thereby determines whether the post-loop unrolled memory reference pair 8 is exactly data dependent with an integral data dependence distance greater than zero as was done for the pre-loop unrolled memory reference pair 4 (as shown in FIG. 2A). In addition to increasing compiler optimizer efficiency by simplifying the data dependence distance calculation for the post-loop unrolled related memory reference pairs 8, when the analyzer 3 determines that one of the related memory reference pairs 8 is exactly dependent at an integral distance greater than zero, it further increases the compiler optimizer efficiency by assigning a state of independent to all the other related memory reference pairs 8 without further calculation.

When the data dependence distance of a post-loop unrolled memory reference pair 8 is an integer greater than zero, the analyzer 3 will terminate further determination of the data dependence distance for any post-loop unrolled memory reference pairs 8 which are related to the same pre-loop unrolled exactly dependent memory reference pair 4. After termination of data dependence analysis for one related set of memory reference pairs 8 the analyzer 3 will begin to execute the dependence distance determination analysis for a different set of related memory references pairs 9 (as shown in FIG. 2B) which are associated with a different pre-loop unrolled exactly dependent memory reference pair 10 (as shown in FIG. 2A).

It will be appreciated that a portion of the analyzer 3 is illustrated in FIG. 2A, FIG. 2B, and FIG. 2C.

The post-loop unrolled memory reference pair determined to be exactly dependent with an integral data dependence distance greater than zero will be a candidate for memory reference re-use which may eliminate a computer register instruction to access data already available in computer memory.

It will be appreciated that no pre-loop unrolled memory reference pairs which are known to be independent (not shown) will be analyzed for data dependence. Their independent state will be assigned during loop unroll. They are candidates for computer pipeline scheduling to exploit parallel computer instruction execution.

Initializing the Analyzer

Figure 3A:
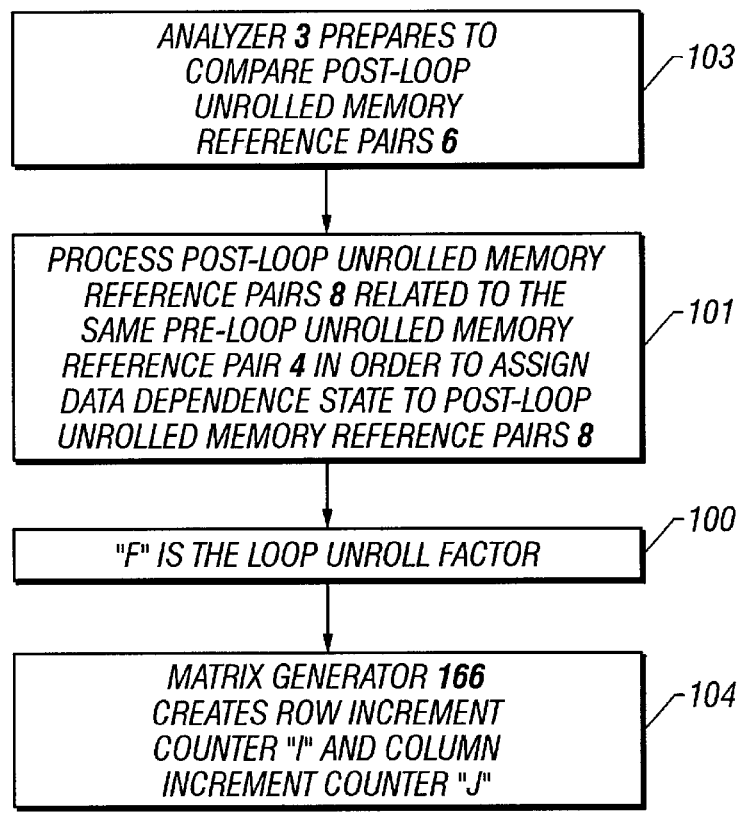
FIG. 3A is a flow diagram illustrating the initialization of the analyzer.

As shown in FIG. 3A, the analyzer 3 in step 103 prepares to compare all the post-loop unrolled memory reference pairs 6. In step 101, the analyzer 3 processes the post-loop unrolled memory reference pairs 8 related to the same pre-loop unrolled memory reference pair 4 in order to assign a data dependence state to each post-loop unrolled memory reference pair 8. In step 100 the analyzer 3 uses the unroll factor, "F" in the process of analyzing the unrolled loop. In step 104 the analyzer 3 uses the matrix generator 166 to create row and column increment counters "I" and "J" to address memory reference pairs. The analyzer 3 uses both "F" and increment counters "I" and "J" to calculate the data dependence distance value for post-loop unrolled memory reference pairs 8.

Determining the Post-loop Unrolled Data Dependence Distances

Figure 3B:
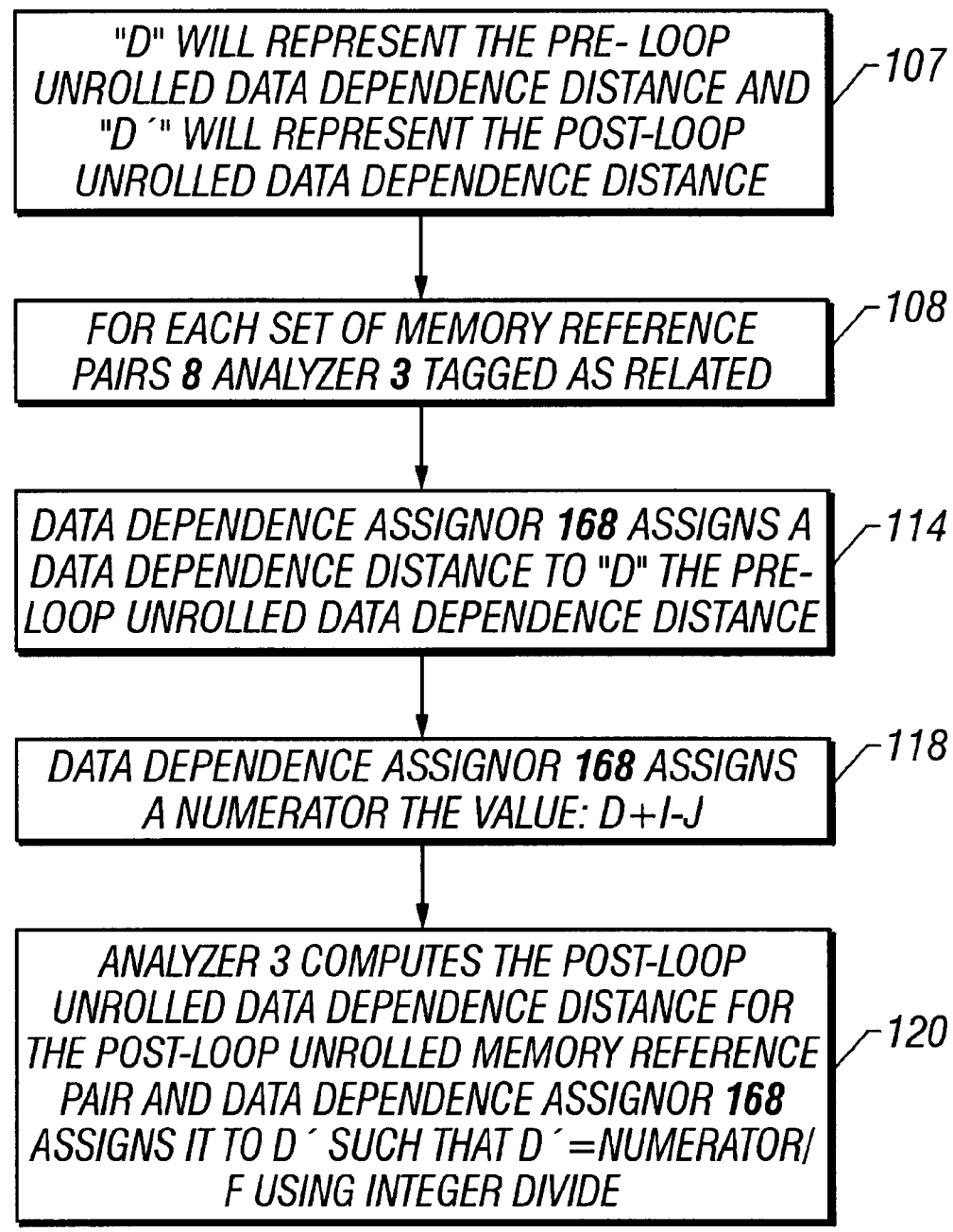
FIG. 3B is a flow diagram illustrating the method used by the analyzer to determine the data dependence distances for post-loop unrolled memory reference pairs.

In the following example, in step 107 "D" will represent the pre-loop unrolled data dependence distance and "D'" will represent the post-loop unrolled data dependence distance, as shown in FIG. 3B. In step 108, the analyzer 3 tags each post-loop unrolled memory reference pair 8 as related if it was generated from the same pre-loop unrolled memory reference pair 4. Next, in order to determine the post-loop unrolled data dependence distance for each tagged as related post-loop unrolled memory reference pair 8, the analyzer a. uses a data dependence distance assignor 168 to assign, in step 114, the pre-loop unrolled memory reference pair data dependence distance to "D";

b. uses the data dependence distance assignor 168 to assign, in step 118, a value of "D+I−J" to a Numerator for a particular memory reference pair located at c. generates, in step 120, the value of "D'" which is defined to be the Numerator divided by "F", using integer divide. The data dependence assignor 168 is used by the analyzer 3 to assign to "D'" the post-loop unrolled data dependence distance for the post-loop unrolled memory reference pair located at "I", "J".

This determines the post-loop unrolled data dependence distance for a pair of post-loop unrolled, tagged as related memory reference pairs.

Figure 3C:
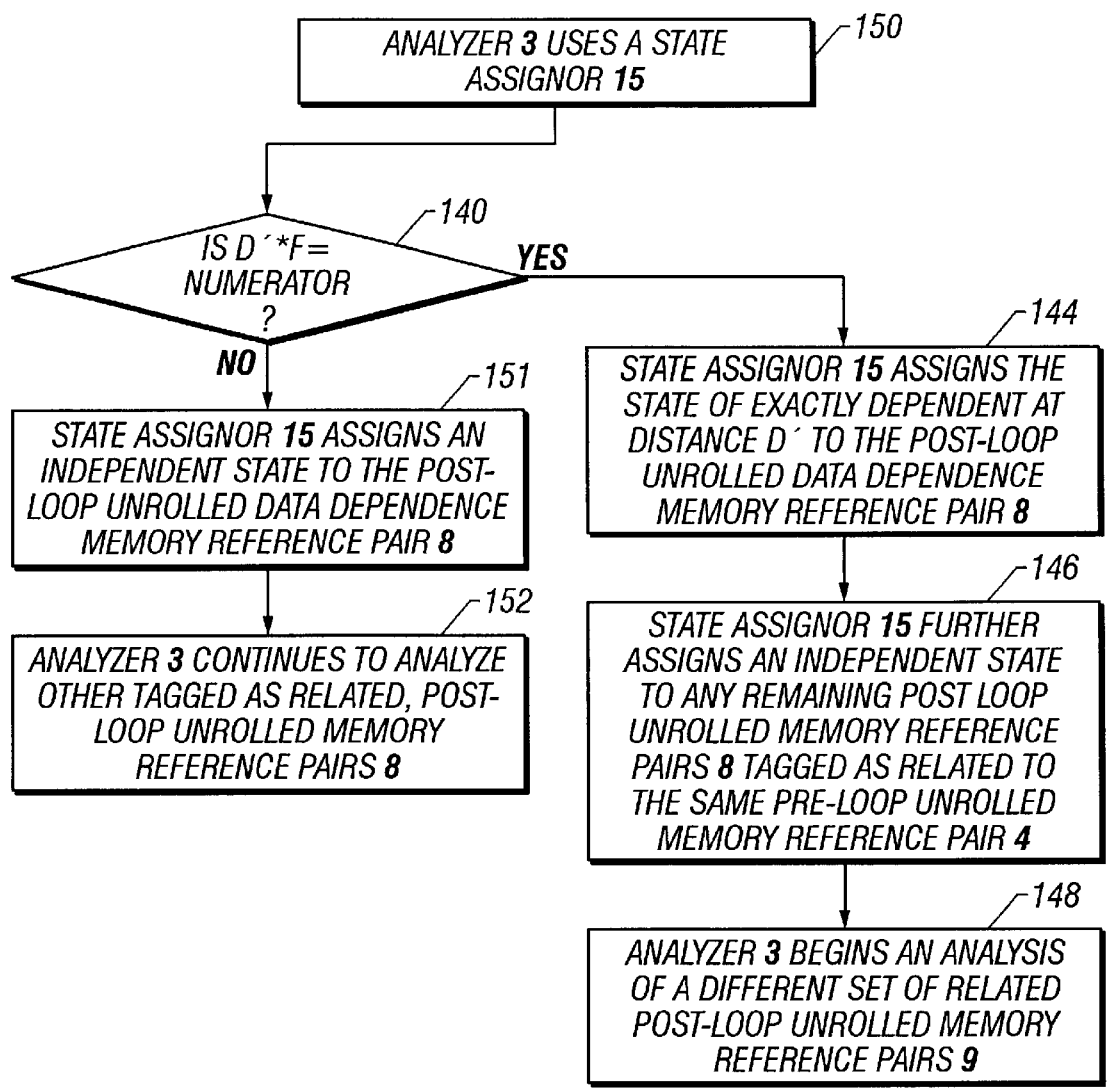
FIG. 3C is a flow diagram illustrating the method used to test and assign the state of independent or dependent for a set of computer memory reference pairs after loop unrolling.

Test and Assign the State of Independent or Exactly Dependent to Post-loop Unrolled Memory Reference Pairs In step 150 analyzer 3 uses a state assignor 15, as shown in FIG. 3C. When the data dependence distance, "D", has been assigned a value by techniques well known to those skilled in the art and "D'" has been assigned a value for the post-loop unrolled memory reference pair related to the memory reference pair corresponding to data dependence distance, "D", the analyzer 3 then tests in step 140 whether "D'" multiplied by "F" is equal to the Numerator.

If the result is false:

a. in step 151, the state assignor 15 assigns an independent state to the post-loop unrolled data dependence memory reference pair 8; and b. in step 152 the analyzer 3 continues to analyze other, tagged as related post-loop unrolled memory reference pairs 8.

If the D'*F=Numerator test 140 is true:

a. in step 144, the state assignor 15 assigns the state of exactly dependent at distance "D'" that was assigned in step 120 (as shown in FIG. 3B) to the post-loop unrolled data dependence memory reference pair 8;

b. since the calculation methods used in test 140 are true when the data dependence distance is an integer and greater than zero, in step 146 the state assignor 15 further assigns an independent state to any remaining post-loop unrolled memory reference pairs 8 tagged as related to the same pre-loop unrolled memory reference pair 4; and c. in step 148 the analyzer 3 begins an analysis of a different set of related post-loop unrolled memory reference pairs 9 (as shown in FIG. 2B).

Therefore, the method of calculating the numerator and dividing by "F" using integer divide, will only result in a positive integer which is greater than zero and passes the test in step 140 when the dependence distance is an integer and greater than zero In summary, the memory reference pairs which were determined to be exactly dependent are candidates for memory reference re-use to eliminate redundant loads. Those memory reference pairs which were determined to be independent are candidates for pipeline scheduling.

In view of the foregoing it will be seen that an optimizing compiler system operates on a plurality of pairs of computer memory references through a matrix generator 166 which generates a row increment counter "I" and a column increment counter "J" which correspond to a computer memory reference location for each of the plurality of pairs of computer memory references. The optimizing compiler also comprises a data dependence distance assignor 168 which assigns a data dependence distance "D" to locations in the pre-loop unrolled matrix and a data dependence distance "D'" to locations in the post-loop unrolled matrix. The data dependence distance "D'" corresponds to each of the plurality of loop unrolled memory reference pairs having the memory reference location "I", "J". The optimizing compiler further comprises a state assignor 15 that assigns to the plurality of pairs of computer memory references a state of exactly dependent or a state of independent.

The analyzer generates a plurality of memory reference pairs from the pre-loop unrolled exactly dependent memory reference pairs during loop unrolling. The analyzer uses a loop unrolling factor, "F". The analyzer tags as related the plurality of loop unrolled memory reference pairs which were generated by the exactly dependent memory reference pair. The analyzer also generates a data dependency, "D'" for the tagged as related memory reference pairs after loop unrolling.

The optimizing compiler system also uses a matrix generator to establish a matrix data structure which further comprises a row increment counter "I" and a column increment counter "J" and a plurality of loop unrolled memory reference pairs each having a computer memory reference location represented by the increment counters "I" and "J". The matrix cells contain a numerator having the value of "D+I–J" which corresponds to each of the plurality of loop unrolled memory reference pairs having the memory reference location "I", "J", and a data dependence distance "D" which also corresponds to each of the plurality of loop unrolled memory reference pairs having the memory reference location "I", "J". "D'" is calculated as the numerator divided by F using integer divide.

The improved method of determining whether two memory references are exactly dependent or independent after loop unrolling and determining the distance of exactly dependent memory references reduces the computer resource overhead during the process of loop unrolled dependence analysis. Also, the elimination of further analysis on a related set of post-loop unrolled memory reference pairs when an exact dependence distance is determined to be an integral greater than zero further reduces computer resource overhead during data dependence analysis after loop unrolling. The present invention improves the efficiency of performing data dependence analysis on loop unrolled memory references.

Although a specific embodiment of the invention has been described and illustrated, the invention is not to be limited to the specific forms or arrangement of parts so described and illustrated. The invention is limited only by the claims.

What is claimed is:

1. A computer implemented method for optimizing a computer program which analyzes data dependence of memory reference pairs in software loops, and unrolls software loops by an unroll factor, comprising the steps of:
   a. analyzing the computer program for data dependence to determine whether two computer instructions access independent memory references or exactly dependent memory references;
   b. determining a data dependence distance for each pair of the exactly dependent memory references;
   c. generating a plurality of memory reference pairs from each exactly dependent memory reference pair; and
   d. tagging the plurality of memory reference pairs as related to the exactly dependent memory reference pair from which they were generated during the software loop unrolling based on the data dependence distance and the unroll factor;
   e. determining which pair of the tagged as related plurality of loop unrolled memory reference pairs is exactly dependent at an integral distance greater than zero and when the exactly dependent memory reference pair is found, the computer implemented method further comprising the steps of:
      a. terminating further determination of the distance for the tagged as related plurality of loop unrolled memory reference pairs;
      b. assigning the independent state to the tagged as related plurality of loop unrolled memory reference pairs which were not identified as exactly dependent at an integral distance greater than zero; and
      c. executing the dependence distance determination for a memory reference pair from the plurality of loop unrolled memory reference pairs which was generated by a different exactly dependent memory reference pair.

2. A computer implemented method as set forth in claim 1, further comprising the step of identifying for the loop-unrolling computer compiler optimizer the pair of the memory references from the tagged as related plurality of loop unrolled memory reference pairs which is exactly dependent at an integral distance greater than zero, as a candidate for memory reference re-use.

3. A computer implemented method as set forth in claim 1, further comprising the step of identifying to the loop unrolling computer compiler optimizer that pipeline scheduling can be executed for any pair of independent memory references.

4. A computer implemented method for optimizing a computer program which unrolls a loop by a factor, F, analyzes a plurality of pairs of computer memory references in the computer program to determine their dependence state, assigns the dependence state of independent to the independent memory reference pairs and assigns the dependence state of exactly dependent to the exactly dependent memory reference pairs, and defines a data dependence distance, D, which corresponds to each pair of exactly dependent memory reference pairs from the plurality of pairs of computer memory references, comprising the steps of:
   a. using a row increment counter I and a column increment counter J to identify the memory reference location of the unrolled memory reference pairs;
   b. determining whether a pair of pre-unrolled computer memory references from the plurality of pairs of computer memory references in the computer program are exactly data dependent and when the pair of computer memory references is exactly dependent, generating during loop unrolling a plurality of loop unrolled memory reference pairs from the pair of exactly dependent memory references;

c. for a pair of unrolled computer memory references, addressing the pair of loop unrolled memory references which were generated from the pair of exactly dependent memory references by the increment counter values for I and J; and d. assigning a value of D+I−J to a numerator value, and assigning a value of D' corresponding to the memory reference location identified by the I and J wherein the value of D' is the value of the numerator divided by F using integer divide.

5. A computer implemented method for optimizing a computer program as set forth in claim 4 further comprising the steps of:

a. repeating the assignment of the value of D' for each loop unrolled memory reference pair having a memory reference location identified by the I and J; and b. when the numerator is equal to the dependence distance D' multiplied by F, assigning the state of independent without further distance determination to the remaining plurality of loop unrolled memory reference pairs which were also generated from the same exactly dependent memory reference pair that generated the memory reference pair corresponding to D'.

6. A computer implemented method as set forth in claim 4, further comprising the step of analyzing a different plurality of loop unrolled memory reference pairs which were generated by a different exactly dependent computer memory reference pair when the numerator is equal to the dependence distance D' multiplied by F.

7. A computer implemented method as set forth in claim 4, further comprising the step of assigning the independent state to the pair of computer memory references if they were independent before the loop was unrolled.

8. A compiler system for detecting a data dependence distance for a plurality of memory reference pairs, with an unroll factor, F, comprising an analyzer for: determining whether the memory reference pairs are exactly dependent or independent; determining the data dependence distance, D, for the exactly dependent memory reference pairs; unrolling software loops and tagging as related a plurality of loop unrolled memory reference pairs which were generated by the exactly dependent memory reference pair; wherein the analyzer further comprises:

a. a matrix generator that uses a row increment counter I and a column increment counter J to establish the plurality of loop unrolled memory reference pairs each having a computer memory reference location represented by an increment value pair from the increment counters I and J;

b. a data dependence distance assignor to:
  i. assign to D the pre-loop unrolled memory reference pair data dependence distance value; and
  ii. assign a data dependence distance D' which is calculated as the value of "D+I−J" divided by F using integer divide, and which corresponds to each of the plurality of loop unrolled memory reference pairs having the memory reference location I, J; and c. a state assignor that assigns to the plurality of pairs of memory references a state of exactly dependent or a state of independent.

9. A computer system as set forth in claim 8, wherein the analyzer will determine whether the distance of any one pair of the plurality of loop unrolled memory reference pairs is exactly dependent at an integral distance greater than zero, and terminate further determination of the data dependence distance for the plurality of loop unrolled memory reference pairs which were tagged as related to the same exactly dependent computer memory reference pair when the exactly dependent at an integral distance greater than zero memory reference pair is located.

10. A computer system as set forth in claim 8, Wherein the analyzer will determine whether the distance of any one pair of the plurality of loop unrolled memory reference pairs is exactly dependent at an integral distance greater than zero, and wherein the state assignor assigns the independent state to the remaining plurality of loop unrolled memory reference pairs which were tagged as related to the same exactly dependent computer memory reference pair when the exactly dependent at an integral distance greater than zero memory reference pair is located.

11. A computer system as set forth in claim 8, wherein the analyzer will determine whether the distance of any one pair of the plurality of loop unrolled memory reference pairs is exactly dependent at an integral distance greater than zero, and execute a distance determination for one pair of the plurality of loop unrolled memory references which was generated by a different exactly dependent memory reference pair when the exactly dependent at an integral distance greater than zero memory reference pair is located.

12. An article of manufacture comprising a computer product for use by a loop unrolling, data dependence analyzing compiler optimizer, further comprising a program storage medium wherein:

a. computer readable program code analyzes a plurality of pairs of computer memory references in the computer readable program code to determine their dependence state, and assigns the dependence state of independent if they are independent and exactly dependent if they are exactly dependent;

b. computer readable program code initializes an unroll factor, F;

c. computer readable program code uses row increment counter I and column increment counter J in an unrolled loop;

d. computer readable program code generates during loop unrolling a plurality of loop unrolled memory reference pairs from the pair of exactly dependent memory references;

e. computer readable program code addresses each pair of loop unrolled memory references which were generated from the pair of exactly dependent memory references by the increment counter values for I and J;

f. computer readable program code defines a data dependence distance D which corresponds to each pair of exactly dependent memory reference pairs from the plurality of pairs of computer memory references;

g. computer readable program code defines a numerator and computes the numerator as D+I−J; and h. computer readable program code defines a data dependence distance D' as the value of the numerator divided by F using integer divide, which corresponds to each of the plurality of loop unrolled memory reference pairs having a memory location I, J.

13. An article of manufacture as set forth in claim 12 wherein, when the numerator is equal to the dependence distance D' multiplied by F, the computer readable program code further assigns the state of independent without further distance determination to the remaining plurality of loop unrolled memory reference pairs which were also generated from the same exactly dependent memory reference pair that generated the memory reference pair corresponding to D'.

14. An article of manufacture as set forth in claim 12 wherein, when the numerator is equal to the dependence distance D' multiplied by F, the computer readable program code further begins analyzing a different plurality of loop unrolled memory references which are related to a different exactly dependent memory reference pair.

15. An article of manufacture as set forth in claim 12, wherein computer readable program code assigns the independent state to the pair of computer memory references if they were independent before the loop was unrolled.

16. A computer-readable memory device for use in a loop unrolling, data dependence analyzing compiler optimizer, having a row increment counter I and a column increment counter J, and having an unroll factor F, encoded with a data structure, the data comprising:
   a. a first array corresponding to a plurality of pairs of computer memory references wherein cells of the first array comprise:
      i. a state for each of the plurality of memory reference pairs, the state being independent if the memory reference pair is independent or exactly dependent if the memory reference pair is exactly dependent;
      ii. a data dependence distance D which corresponds to each pair of exactly dependent memory reference pairs from the plurality of pairs of computer memory references;
   b. a second array corresponding to a plurality of loop unrolled memory reference pairs which are generated from pairs of exactly dependent memory references from the first array, when the loop is unrolled, each pair of the plurality of loop unrolled memory reference pairs comprising:
      i. a computer memory reference represented by the increment counters I and J;
      ii. a data dependence distance D'; and
      iii. the data dependence distance D' being the value of "D+I−J" divided by F, using integer divide.

17. A computer-readable memory device as set forth in claim 16, the data structure further having a parameter corresponding to a state of independent for the pair of computer memory references if they were independent before the loop was unrolled.

* * * * *